Patented Feb. 6, 1934

1,946,256

UNITED STATES PATENT OFFICE 1,946,256

PREPARATION OF CARBOXYLIC ACIDS

John C. Woodhouse, Wilmington, Del., assignor to E. I. du Pont de Nemours & Company, Wilmington, Del., a corporation of Delaware No Drawing. Application June 28, 1932
Serial No. 619,735

13 Claims. (Cl. 260—116)

This invention relates to a process for the formation of organic compounds and particularly to the preparation of monocarboxylic acids by the interaction of aliphatic alcohols and carbon monoxide in the presence of a catalyst.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of an aliphatic alcohol with a carbon oxide in the presence of a catalyst. Another object of this invention is to provide a process for the preparation of acids having the structural formula: $C_nH_{2n+1}COOH$—from alcohols having the structural formula: $C_nH_{2n+1}OH$— by subjecting the alcohols to the action of the carbon monoxide in the presence of a volatile halide catalyst associated with a form of activated carbon. Other objects will hereinafter appear.

I have found that acids can be prepared by the interaction of alcohols and carbon monoxide in the presence of a hydrogen halide or a compound, which decomposes to form a hydrogen halide under the conditions existing during the reaction, associated with a form of activated carbon. In order to effect the reaction the reactants together with a halogen containing compound, or a volatile halide, such as a hydrogen halide, are passed, under suitable pressure and temperature conditions, into a reaction chamber in which there has been disposed a form of activated carbon.

It is not essential that other catalytic materials be present in association with the activated carbon, for what may be called the two-component catalyst, i. e. hydrogen halide and activated carbon, will give an excellent conversion of the alcohol to the acid. For various reasons, however, such as longevity, high space-time-yield, etc., it is often of advantage to have another catalyst associated with the activated carbon. The catalysts which have been found to be well fitted for this purpose include the acid catalysts such as phosphoric acid, arsenic acid, boric acid, silico tungstic acid, etc.; the metallic halides which include more particularly the alkali and alkaline earth metal halides, viz. the bromides, chlorides, and iodides of lithium, sodium, potassium, rubidium, calcium, caesium, strontium, magnesium, and barium, as well as the halides of the following metals: tin, iron, cobalt, nickel, bismuth, manganese, lead, tellurium, zinc, and cadmium; and the acid salts of arsenic, boron, chromium, vanadium, silicon, molybdenum, tungsten, e. g. ammonium phosphotungstate, chromium vanadate, etc. These catalysts, to be associated with the activated carbon, are all of an acidic nature. That is, either they are acids or under the conditions of the reaction hydrolyze or otherwise decompose to give an acidic constituent. Such catalysts will be designated in the claims as "solid acidic catalysts" in contradistinction to the volatile halides which I will now more fully particularize.

The volatile halides which I prefer to employ include the hydrogen halides, e. g. hydrogen chloride, hydrogen iodide, and hydrogen bromide. It is not essential that the halide be added as hydrogen halide to the reaction for compounds, which decompose to give such halides or which form the halides under the conditions of the reaction, are likewise suitable. Examples of such compounds are the volatile organic halides, as methyl and ethyl chloride, iodide, bromide, etc., as well as the ammonium halides, e. g. ammonium chloride, ammonium iodide, the chloramines, etc.

The halide is preferably added to the alcohol and carbon monoxide prior to the reaction, but it may be added in portions to the reaction chamber during the progress thereof or in any other suitable manner.

The alcohol-carbon monoxide reactions which can be accelerated by the above described catalysts may be expressed as follows:

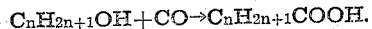
$$C_nH_{2n+1}OH + CO \rightarrow C_nH_{2n+1}COOH.$$

In accordance with the particular operating conditions, it will be found that, in some instances, the acid may not be obtained in the free state, but may be produced as the ester of the alcohol. The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more separate hydrolyzable alkoxy groups. In addition the alkyl amines,—methyl amine, ethylamine, etc., or the alkyl halides,—methyl chloride, ethyl bromide, etc., may be substituted for the alcohol. When using the alyky halides little or no additional volatile halide is usually required.

The synthesis can generally be efficiently carried out under the following operating conditions. The pressure may vary from approximately 25 atmospheres to 900 atmospheres or higher with the preferable operating range in the neighborhood of 350–700 atmospheres. These pressures do not differ materially from those used when other types of catalysts are employed for this synthesis nor do the temperatures vary appreciably from those already known for reactions of this type. For example, the process can be suitably carried out, with my catalyst, at temperatures of between 200–400° C., but still higher or lower temperatures may also be used in some cases, the speed of the reaction being increased, as would be expected, by the use of higher temperatures.

The carbon monoxide used may be obtained from various commercial sources, such, for example, as from water gas, producer gas, coke oven gas, etc., but to obtain products of the highest degree of purity it is usually preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but generally I prefer to introduce methanol directly into the gas stream.

The process can be conveniently carried out by passing purified carbon monoxide into aqueous methanol maintained at such a temperature that the issuing gases will have the requisite proportion of methanol, carbon monoxide, and water vapor which is generally desired. The halide used, which is volatile under the conditions of the reaction, may be dissolved in water which may be injected into the system to give the desired amount of this catalyst and total water vapor. Or, alternatively, the volatile halide may be dissolved in aqueous methanol and the resulting solution injected into the carbon monoxide stream prior to the reaction. A gaseous composition, containing an excess of carbon monoxide over the methanol vapor, will give a good yield of acetic acid and ester on one pass thru a converter, the temperature of the reaction chamber being maintained at approximately 375° C. and the pressure held in the neighborhood of 700 atmospheres.

Not only can methanol and carbon monoxide be catalyzed in the presence of my catalyst to acetic acid, or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into acid having correspondingly one more carbon atom than the alcohol treated. In fact, my process and catalyst may apparently be employed with any of the alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohols, the ethers, amines, halides, or esters thereof, the use of which will result in a good conversion with generally some slight modification in the ratio of acid to other products obtained.

I will now describe specific embodiments of my process but it will be understood that the details therein given and the compounds employed, either as reactants or catalysts, in no way restrict the scope of this invention, but merely illustrate several methods of conducting the synthesis with my preferred catalysts.

*Example 1.*—Eighty-five parts of carbon monoxide are thoroughly diffused with 3 parts of hydrogen chloride, the resulting mixture, together with 5 parts of methanol, 2 parts of hydrogen, and 5 parts of water vapor, are passed into a conversion chamber, in which there is disposed a copper chloride catalyst supported on activated charcoal, at a temperature of 350° C. and a pressure of 700 atmospheres. An excellent yield of acetic acid and methyl acetate is obtained upon the condensation of the gases from the conversion.

*Example 2.*—A gaseous mixture containing 80% carbon monoxide, and 5% each of methanol, water vapor, and hydrogen, is passed together with approximately 5% of hydrogen chloride over activated charcoal which is disposed in a conversion chamber suitable for the carrying out of gaseous exothermic reactions. The reaction is conducted at a temperature of approximately 350° C. and a pressure of approximately 700 atmospheres. Upon condensation of the products of the reaction a good yield of acetic acid is obtained together with a small amount of other aliphatic acids.

*Example 3.*—Into a gaseous mixture comprising 97.5% carbon monoxide, 0.1% carbon dioxide, and 2.4% undetermined, is injected a liquid containing, in parts by weight, 69 parts of methanol, 23.5 parts of water, and 10 parts of hydrochloric acid (sp. gr. 1.19). This liquid is injected in an amount sufficient to give a methanol to carbon monoxide ratio, in the vapor phase, of 1:20. The resulting gaseous mixture, at a temperature of 350° C. and a pressure of 700 atmospheres is introduced into a reaction chamber containing activated charcoal holding, supported thereon, 20% by weight of manganese chloride. The products obtained upon condensation of the converted gases contain acetic acid and methyl acetate.

*Example 4.*—Under conditions identical with those given in Example 1 the gaseous mixture therein described is passed over a zinc chloride catalyst supported on activated charcoal. An excellent yield of acetic acid and methyl acetate is obtained.

The apparatus, which may be employed for conducting these reactions, may be of any conventional type and preferably one in which the temperature of the exothermic reaction can be readily controlled at the optimum value. Owing to the corrosive action of the acids present the interior of the converter and apparatus leading therefrom should preferably be protected. This may be accomplished by using glass or glass-lined apparatus or by plating the inner surfaces of the apparatus with silver, or using for the construction of this equipment acid-resisting alloy steels containing, for example, molybdenum, cobalt, tungsten, chromium, manganese, or nickel.

Various changes may be made in the method hereinbefore described without departing from the invention or sacrificing any of the advantages thereof.

I claim:

1. In a process of reacting an aliphatic alcohol and carbon monoxide and thereby producing an aliphatic carboxylic acid the employment of a volatile halide associated with a form of activated carbon as the catalyst for the reaction.

2. In a process of reacting an aliphatic alcohol and carbon monoxide, and thereby producing an aliphatic carboxylic acid, the employment of a hydrogen halide associated with a form of activated carbon as a catalyst for the reaction.

3. In a process of reacting an aliphatic alcohol and carbon monoxide, and thereby producing an aliphatic carboxylic acid, the employment of a volatile halide associated with a "solid acidic catalyst" and a form of activated carbon as the catalyst for the reaction.

4. In a process of reacting an aliphatic alcohol and carbon monoxide, and thereby producing an aliphatic carboxylic acid, the employment of a hydrogen halide associated with a "solid acidic catalyst" and a form of activated carbon as the catalyst for the reaction.

5. In a process of reacting an aliphatic alcohol and carbon monoxide, and thereby producing an aliphatic carboxylic acid, the employment of hydrogen chloride associated with activated charcoal as the catalyst for the reaction.

6. In a vapor phase process for the preparation of aliphatic organic acids from compounds containing at least one separate hydrolyzable alkoxy group and carbon monoxide the step which comprises effecting the reaction in the presence of a volatile halide associated with a form of activated carbon as the catalyst for the reaction.

7. In a vapor phase process for the preparation of aliphatic organic acids from compounds containing at least one separate hydrolyzable lkoxy group and carbon monoxide the step which comprises effecting the reaction in the presence of a hydrogen halide associated with a "solid acidic catalyst" and a form of activated carbon as the catalyst for the reaction.

8. In a vapor phase process for the preparation of aliphatic organic acids from compounds containing at least one separate hydrolyzable alkoxy group and carbon monoxide the step which comprises effecting the reaction in the presence of the following co-acting catalysts: a volatile halide and a form of activated carbon.

9. In a vapor phase process for the preparation of aliphatic organic acids from compounds containing at least one separate hydrolyzable alkoxy group and carbon monoxide the step which comprises effecting the reaction in the presence of the following co-acting catalysts: a hydrogen halide, a "solid acidic catalyst", and a form of activated carbon.

10. In a vapor phase process for the preparation of aliphatic organic acids from compounds containing at least one separate hydrolyzable alkoxy group and carbon monoxide the step which comprises effecting the reaction in the presence of the following co-acting catalysts: hydrogen chloride, a metal halide, and activated charcoal.

11. In a vapor phase process for the preparation of acetic acid from a gaseous mixture containing methanol and carbon monoxide the step which comprises passing the methanol and carbon monoxide together with a volatile halide over an activated carbon catalyst.

12. In a vapor phase process for the preparation of acetic acid from a gaseous mixture containing methanol and carbon monoxide the step which comprises passing the methanol and carbon monoxide together with a hydrogen halide over an activated carbon catalyst.

13. In a vapor phase process for the preparation of acetic acid by the interaction of methanol and carbon monoxide the step which comprises passing methanol, carbon monoxide, and hydrogen chloride over a catalyst comprising manganese chloride and activated charcoal.

JOHN C. WOODHOUSE.